United States Patent [19]

McDonald et al.

[11] 4,358,823
[45] Nov. 9, 1982

[54] DOUBLE REDUNDANT PROCESSOR

[75] Inventors: John C. McDonald, Los Gatos; James R. Baichtal, Los Altos, both of Calif.

[73] Assignee: TRW, Inc., Mountain View, Calif.

[21] Appl. No.: 29,380

[22] Filed: Apr. 12, 1979

Related U.S. Application Data

[63] Continuation of Ser. No. 781,437, Mar. 25, 1977, abandoned.

[51] Int. Cl.³ .............................................. G06F 11/20
[52] U.S. Cl. ........................................ 364/200; 371/9; 371/68
[58] Field of Search ... 364/200 MS File, 900 MS File; 371/9, 68

[56] References Cited

U.S. PATENT DOCUMENTS

| 3,252,149 | 5/1966 | Weida et al. | 364/200 |
|---|---|---|---|
| 3,303,474 | 2/1967 | Moore et al. | 364/200 |
| 3,395,396 | 7/1968 | Pasternak | 364/900 |
| 3,409,879 | 11/1968 | Keister | 364/200 |
| 3,444,528 | 5/1969 | Lovell et al. | 364/200 |
| 3,503,048 | 3/1970 | Avsan et al. | 364/200 |
| 3,786,433 | 1/1974 | Notley et al. | 364/200 |
| 3,810,119 | 5/1974 | Zieve et al. | 364/200 |
| 3,931,505 | 1/1976 | Sevcik | 364/200 |
| 4,198,678 | 4/1980 | Maatje | 371/68 X |

OTHER PUBLICATIONS

Fitzgerald, "Fault-Tolerant Computer Switch", IBM TDM, vol. 20, No. 4, Sep. 1977, pp. 1351–1354.

Primary Examiner—Gareth D. Shaw
Assistant Examiner—Thomas M. Heckler
Attorney, Agent, or Firm—Flehr, Hohbach, Test et al.

[57] ABSTRACT

A double redundant processor including first and second master processors for processing data, control and address signals in a data processing system. The first master processor is in an active state for processing the signals and the second master processor is in a standby state for processing the signals. The first and second master processors include first and second subprocessors for simultaneously processing the data, control and address signals, a comparator connected to compare the signals from the first and second subprocessors, thereby generating a comparison error signal if a disagreement exists, and an alarm monitor responsive to the error signal for inactivating the active master processor and activating the standby master processor.

16 Claims, 6 Drawing Figures

DOUBLE REDUNDANT PROCESSOR

This is a continuation of application Ser. No. 781,437, filed Mar. 25, 1977, now abandoned.

CROSS REFERENCE TO RELATED APPLICATIONS

1. INTEGRATED MESSAGE ACCOUNTING SYSTEM, Ser. No. 781,348, filed Mar. 25, 1977, now U.S. Pat. No. 4,172,214, issued Oct. 23, 1979 invented by John C. McDonald and James R. Baichtal, and assigned to the same assignee of the present invention.

2. SERVICE GENERATOR CHECKING APPARATUS, now U.S. Pat. No. 4,071,704, issued Jan. 31, 1978 Johannes A. R. Moed, and assigned to the same assignee of the present invention.

BACKGROUND OF THE INVENTION

The present invention relates to redundant processors operating in parallel and particularly to processors which run synchronously in conjunction with the operation of an integrated telephone message accounting system (IMAS).

In prior telephone switching systems, redundant processors and self-checking techniques have been employed to prevent a single point failure which otherwise could cause the entire system to stop functioning. In such systems, faulty subsystems are automatically switched off-line to provide minimum interruption to service.

In one prior system, redundant processors each perform identical jobs and each compares the other's output. When a difference in output exists, each processor enters a diagnostic subroutine to determine which of the processors is defective. This prior system, however, requires positive synchronization between the processors. Also, that prior system requires considerable software dedicated to the diagnostic subroutine. The diagnostic subroutine undesirably requires large memory capacity and execution of the diagnostic subroutine impares the normal function of handling system traffic.

Another prior system employs two processors each with a self-test subroutine which is periodically run. In such a prior system, positive synchronization is desirably not required since only one processor is active and the other is standby. However, such a system has a problem in that single point failures are detected only with a software subroutine.

In view of the above background, there is a need for an improved processor configuration which economically eliminates processing stoppages due to single point failures, without introducing software burdens which degrade the real time performance of the normal system functions.

SUMMARY OF THE INVENTION

The present invention relates to a double redundant processor and method in which four processors are organized into two redundant pairs. In one preferred embodiment, two master processors are each made from two subprocessors and a comparator. The subprocessors operate in lock step to form outputs which are continuously compared by the comparator. If the comparison yields a disagreement, then the master processor (consisting of the two subprocessors and the comparator) is declared to be faulty. Upon a fault condition, processing is normally switched to the standby master processor.

In one embodiment of the present invention, the double redundant processor includes first and second master processors where the first master processor is in an active state for processing data, control, and address signals in a data processing system. A second master processor is in a stand-by state for processing the signals. The first and second master processor each include first and second subprocessors for simultaneously processing the signals, a comparator connected to compare the signals from the first and second subprocessors, thereby generating a comparison error signal if a comparison error occurs, and an alarm monitor responsive to the error signal for inactivating the active master processor and activating the stand-by master processor.

The method of checking the operation of the master processor comprises the steps of continuously comparing the signals of the first and second subprocessors, generating a comparison error signal when a comparison error occurs, and inactivating the active master processor and activating the stand-by master processor in response to an occurrence of the error signal from the active master processor.

In accordance with the above summary, the present invention achieves the objective of providing a double redundant processor which eliminates processing stoppages due to signal point failures without introducing software burdens which degrade the real time performance of the normal system functions.

Additional objects and features of the invention will appear from the following description in which the preferred embodiments of the invention have been set forth in detail in conjunction with the drawings.

DETAILED DESCRIPTION OF THE INVENTION

Figure 1:
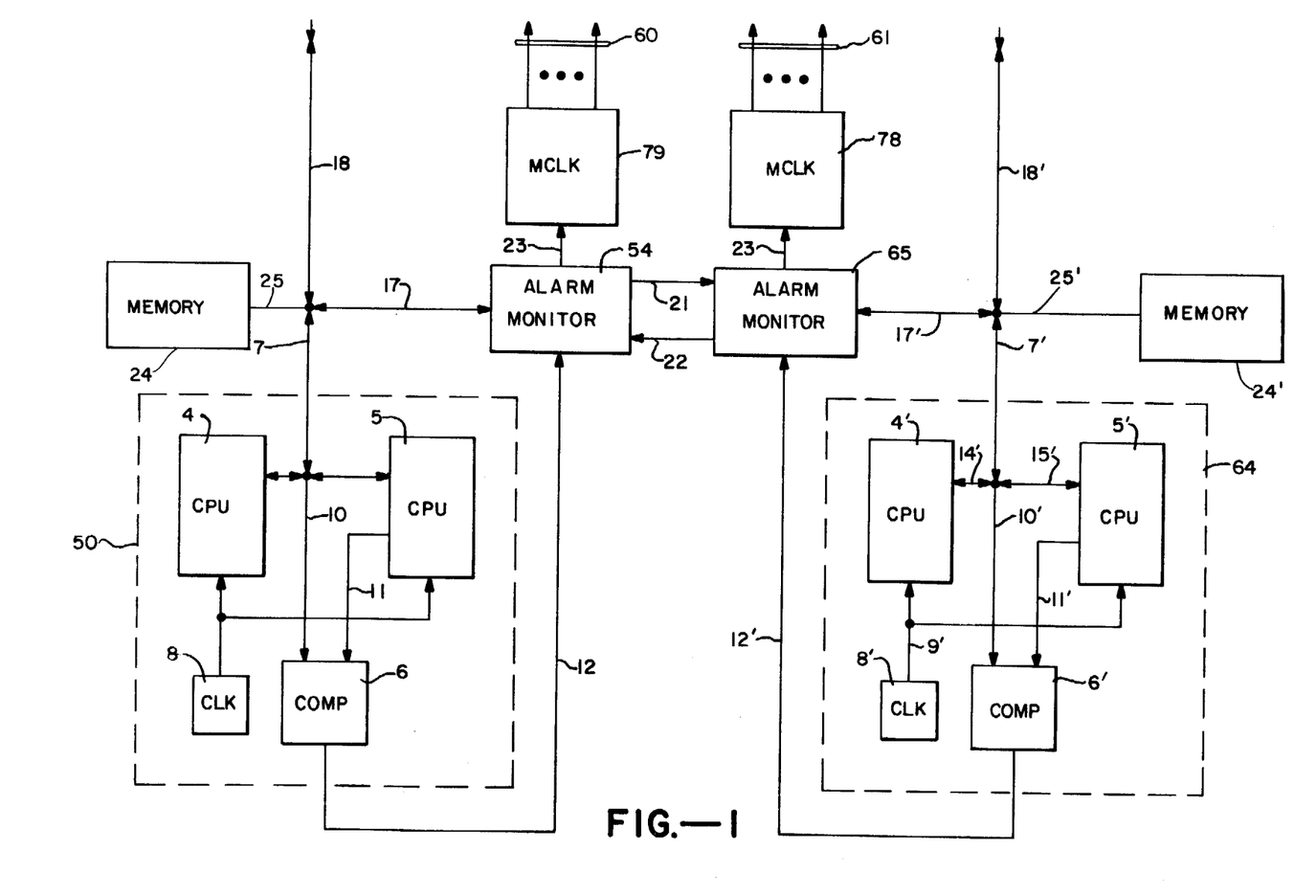
FIG. 1 depicts a block diagram of a double redundant processor.

Referring to FIG. 1, the double redundant processor of the present invention is shown including a first master processor 50 and a second redundant master processor 64.

The processor 50 is actively processing data, address, and control signals utilized in a data processing system. For example, in the above-identified application entitled "Integrated Message Accounting System", the processor 50 is on-line and actively processing signals for that system.

The redundant master processor 64 is off-line and available for switching to on-line should the master processor 50 experience a failure. The redundant master processor 64 is in a standby status for checking other subsystems of the message accounting system such as that described in the above-identified application entitled "Service Generator Checking Apparatus".

The redundant master processor is updated continuously by the active master processor through direct memory accessing (not shown). Direct memory accessing techniques are well known in the art.

The processor 50 includes redundant subprocessor units 4 and 5, and comparator 6. Subprocessor 4 receives data, control, and address signals on bus 7, which is connected to I/O peripheral devices (not shown) common to any data processing system via bus 18. Clock 8 includes a conventional crystal oscillator and counter to provide proper clocking signals for subprocessors 4, 5 and comparator 6.

Subprocessor 5 simultaneously executes the same data, control and address signals as subprocessor 4. Subprocessor 4 connects signals to comparator 6 via bus 10. Subprocessor 5 will connect those same signals to comparator 6 via bus 11. Should comparator 6 detect any comparison error or bus parity error, an error signal will be generated and transmitted to alarm monitor 54 via bus 12.

Alarm monitor 54 provides a reset signal to master processor 50 upon receipt of the error signal. Also, alarm monitor 54 will inactivate master clock 79 via bus 23, which is providing typical clock signals for activating various subsystems connected to the master processor 50. Also, alarm monitor 54 will relay via bus 21 an alarm signal to alarm monitor 65.

When processor 50 detects an error signal, the alarm signal from alarm monitor 54 relayed to monitor 65 will enable processor 64 to go on-line and actively process data, control, and address signals via bus 7', 18'. Alarm monitor 65 will activate via bus 23' master clock 78, which provides the same clocking signals as master clock 79. The operation of processor 65 is therefore identical to that of processor 50 when on-line.

Master clock 79 is providing clock signals in the above-identified application entitled "Integrated Message Accounting System" to the primary portion of that system. A redundant secondary portion is included in that system which is controlled by clock signals from master clock 78 of FIG. 1. The master clock 79 and 78 thus provide an active signal to the respective subsystems.

For the active signal to a subsystem, that subsystem will receive and transmit data since it is in an on-line condition.

While in a standby condition the master processor 64 and associated master clock 78 are processing various checking routines to insure that the subsystems are operational and ready to go on-line should the primary subsystem experience a failure.

Should the primary subsystem experience a failure, this fact will be detected by master processor 50 which informs alarm monitor 54. Alarm monitor 54 will deactivate master clock 79 and send alarm and online signals to alarm monitor 65 in the secondary subsystem. The alarm monitor 65 will activate master clock 78, which will in turn allow the various subsystems of the secondary portion of the integrated message accounting system to actively receive and transmit those signals used in the system. Master processor 64 is switched online with the remainder of the secondary subsystem.

The subprocessors 4, 5 of FIG. 1 are Intel 8080 microprocessors with the accompanying bus drivers and receivers. The operation of the Intel 8080 microprocessor is well-known, but will be discussed briefly in conjunction with FIGS. 2 and 3.

Figure 2:
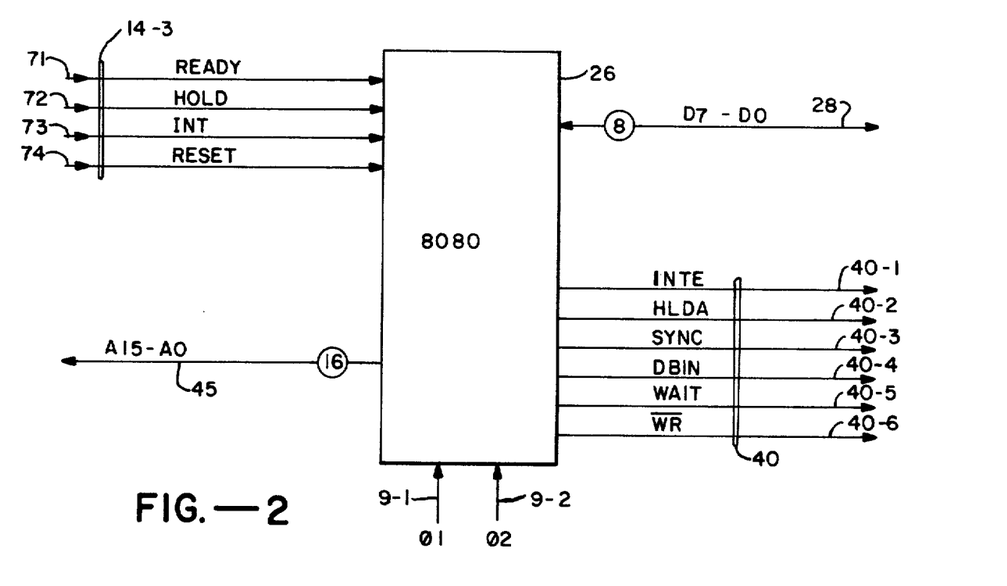
FIG. 2 depicts a block diagram of a subprocessor which forms a portion of FIG. 1.

Referring to FIG. 2, the bus connections for the Intel 8080 are shown, except for voltage references.

Address bus 45 is a 16 bit bus (A15-A0) which provides the address to memory (up to 64K 8-bit words) or denotes the I/O device number for up to 256 input and 256 output devices. A0 is the least significant address bit.

Bus 28 (D7-D0) is an 8-bit data bus connection and provides bidirectional communication between memory and I/O devices for instructions and data transfers. D0 is the least significant bit.

SYNC signal on bus 40-3 is an output synchronizing signal to indicate the beginning of each machine cycle. Instructions can be executed in 1-5 machine cycles, and the status information of each machine cycle is sent to external latches at SYNC time.

The data bus in signal (DBIN) on bus 40-4 indicates to external circuits that the data bus is in the input mode. This signal is used to enable the gating of data onto the data bus 28 from memory or an I/O device number.

The READY signal on bus 71 indicates to the 8080 that valid memory or input data is available on the data bus. This signal is used to synchronize the CPU with slower memory or I/O devices. If, after sending address out, the 8080 does not receive a ready input, it will enter a wait state for as long as the ready line is low.

The WAIT signal on bus 40-5 acknowledges that the CPU is in a wait state.

The $\overline{WR}$ signal on bus 40-6 is a WRITE signal for memory write or I/O output control. The data on the data bus is stable while the $\overline{WR}$ signal is active.

Figure 3:
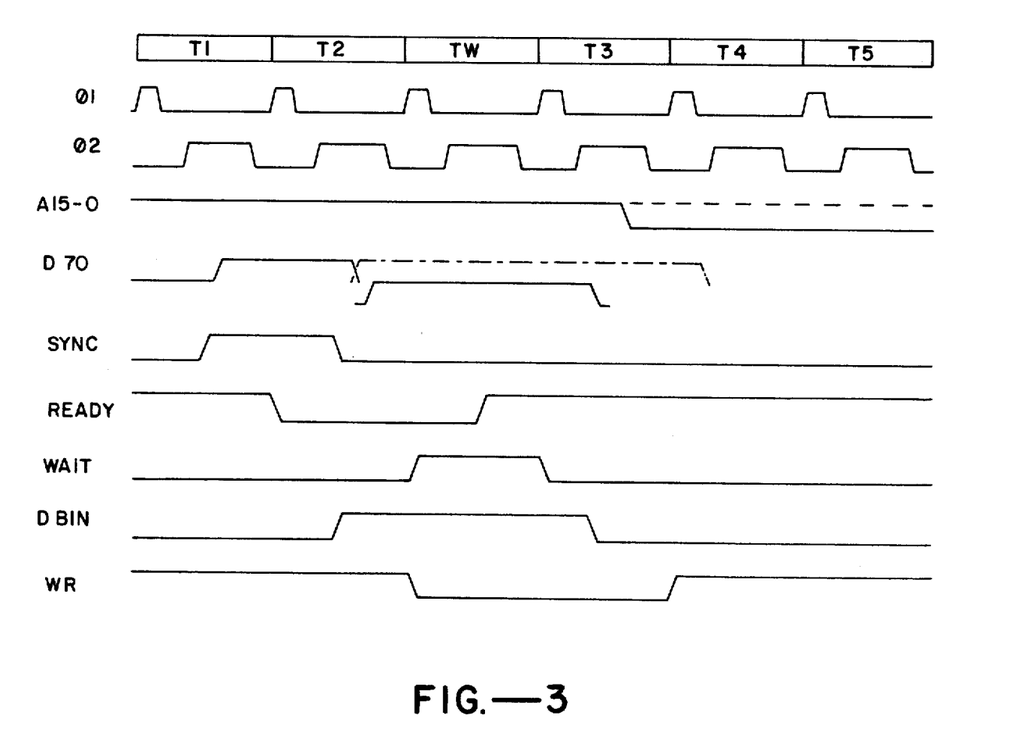
FIG. 3 depicts a timing diagram for the control, data and address signals shown in FIG. 2.

The HOLD signal on bus 72 requests the CPU to enter the HOLD state. The HOLD state allows an external device to gain control of the 8080 address and data bus as soon as the 8080 has completed its use of these buses for the current machine cycle. It is recognized if the CPU is in the halt state or in the T2 or Tw state and the ready signal is active. These conditions are shown in FIG. 3.

In FIG. 2, as a result of entering the hold state, the address bus 45 (A15-A0) and data bus 28 (D7-D0) will be in the high impedance state. The CPU acknowledges its state with the hold acknowledge (HLDA) signal on bus 40-2. The CPU will always finish the execution of the current machine cycle. When the HOLD signal is removed, the operation will resume from the T1 time of the next machine cycle.

The HOLD ACKNOWLEDGE (HLDA) signal on bus 40-2 appears in response to the HOLD signal on bus 72 and indicates that the data and address bus will go to the high impedance state. The HLDA signal begins at state T3 in FIG. 3 for read memory or input and the clock period following T3 for a write memory or output operation. In either case, the HLDA signal appears after the rising edge of phase 1 ($\phi$1) and the high impedence occurs after the rising edge of phase 2 ($\phi$2) as seen in FIG. 3.

The INTE (interrupt enable) signal on bus 40-1 indicates the content of an internal interrupt enable flip-flop (not shown). The flip-flop is automatically reset at time T1 of the instruction fetch cycle when an interrupt is accepted and is also reset by the reset signal.

The INT (interrupt request) signal on bus 73 enables the CPU to recognize an interrupt request on this line at the end of the current instruction or while halted. If the CPU is in the HOLD state or if the interrupt enable flip-flop is reset, it will not honor the request. The CPU acknowledges acceptance of an interrupt by sending out the INTA (interrupt acknowledge) status signal at SYNC time. During the next instruction fetch cycle, the program counter is not advanced and any one byte instruction can be inserted.

The RESET signal on bus 74 clears the content of the program counter and the instruction register is set to 0. After reset, the program will start at location 0 in memory.

The phase 1 ($\phi$1) and phase 2 ($\phi$2) signals on buses 9-1, 9-2, respectively, are two externally supplied clock phases from clock 8 of FIG. 1 and are shown in FIG. 3.

Referring to FIG. 3, a basic 8080 instruction cycle is shown. Each instruction requires from 1 to 5 machine cycles or memory cycles for fetching an execution. Machine cycles are called M1, M2, . . . , M5. Each machine cycle requires from 3 to 5 states T1, T2, . . . , T5 for its completion. Machine cycle M1 is always the operation code fetch cycle and lasts 4 or 5 clock periods. Machine cycles M2, M3, M4 and M5 normally last 3 clock periods each.

Signals phase 1 ($\phi$1) and phase 2 ($\phi$2) are generated by dividing a 2 MHz clock down to 500 KHz. The other signals in FIG. 3 have already been described. For further details of the operation of the Intel 8080 microcomputer, and the interconnections with other peripheral I/O devices, see the Intel 8080 Microcomputer System Users Manual.

Figure 4:
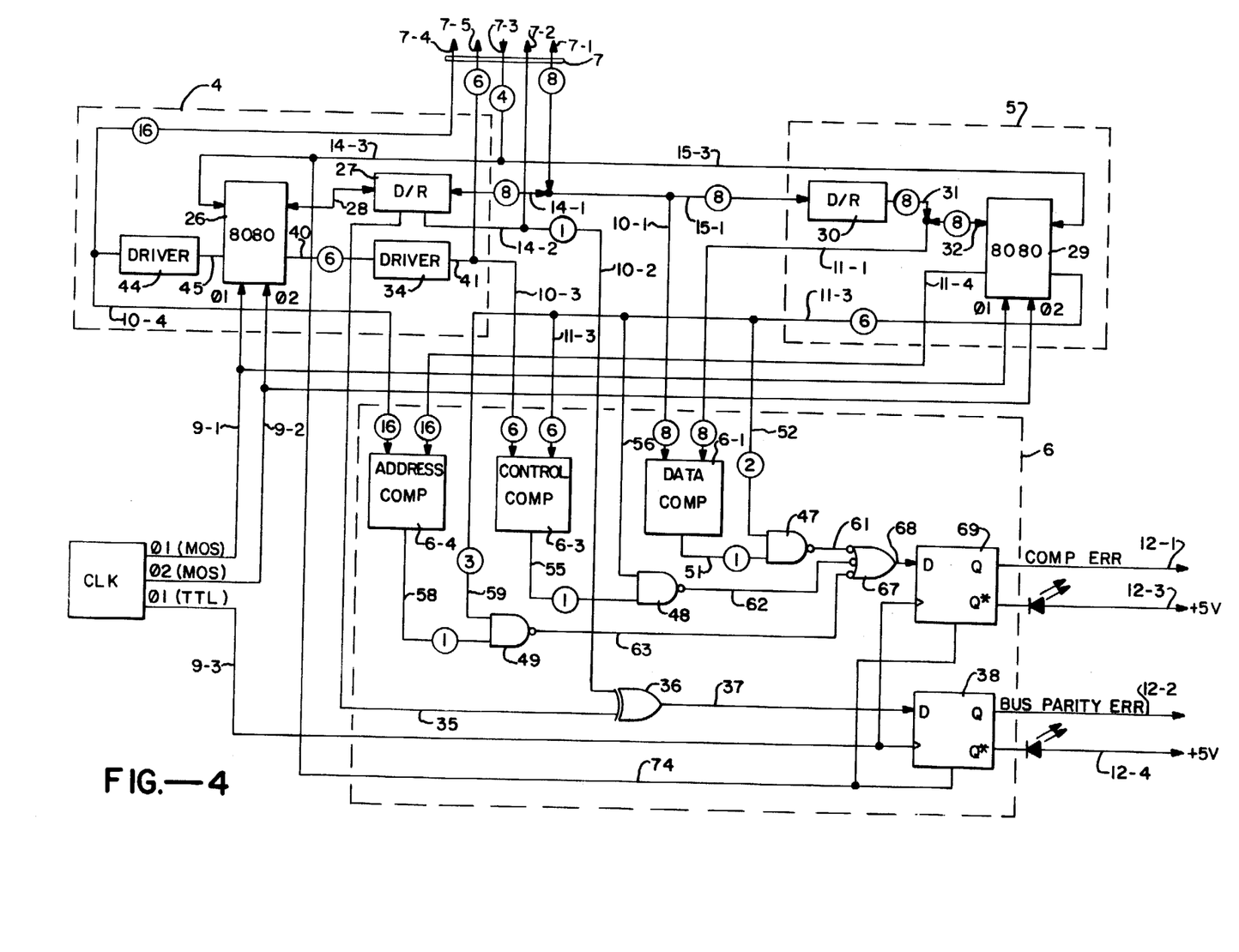
FIG. 4 depicts a partially block and partially schematic diagram of a master processor, which forms one of the double redundant processors of FIG. 1.

Referring to FIG. 4, the master processor 50 of FIG. 1 is shown in further detail. Processor 64 of FIG. 1 is identical to that of processor 50 and therefore need not be described. However, the details of the description of processor 50 will apply with equal effect to processor 64.

Referring to FIG. 4, the heart of the processor 50 is subprocessor 26, which is an Intel 8080A microprocessor, and has already been described. Data signals from other peripheral devices are carried by 8-bit bidirectional data bus 7-1. Data is transmitted and received by subprocessor 26 via bus 14-1, conventional driver/receiver 27, and bus 28. Bus 14-1 is a bidirectional data bus connected to bus 7-1 and carries data to and from driver/receiver 27.

To check the operation of subprocessor 26, another Intel 8080A microprocessor 29 is shown and receives data from conventional driver/receiver 30. Driver/receiver 30 receives data from bus 7-1 via unidirectional data bus 15-1.

Driver/receiver 30 is wired only to receive data, as subprocessor 29 is not needed to output data, control, and address signals to other peripheral devices.

Subprocessor 29 receives data information from driver 30 via unidirectional bus 31 and bidirectional bus 32.

During an output cycle, data transmitted by subprocessor 26 to other devices via bus 14-1 is also transmitted to data comparator 6-1 via bus 10-1. Since subprocessor 29 is simultaneously executing the same signal, it will send data signals to data comparator 6-1 via bus 32, 11-1. Data bus 11-1 is a unidirectional data bus.

Data comparator 6-1 includes conventional exclusive OR gates for comparing each of the data bits, and will change state whenever a comparison error is detected. The comparison error on bus 51 is input to NAND gate 47, which is enabled by control signals SYNC or WR on bus 52, as data need only be enabled during an output cycle. The output of NAND gate is one input to NAND gate 67.

Driver/receiver 27 also includes a parity checker (not shown) for checking the parity of data bus 7-1. Data parity bit input on bus 7-2 is input to exclusive OR gate 36 via bus 10-2 along with parity from the parity check via bus 35. When a parity error exists, that fact is latched into flip-flop 38 via bus 37 by the $\phi$1 signal on bus 9-3. The Q output from flip-flop 38 on bus 12-2 is a parity error signal to the alarm monitor 54 of FIG. 1. Also, the Q* output on bus 12-4 is input to a light emitting diode (LED) to indicate visually that a parity error exists.

In FIG. 4, control signals are input to the processor 50 via bus 7-3 and are simultaneously input to subprocessor 26, 29, via buses 14-3, 15-3, respectively. The input control signals are READY, HOLD, INT, and RESET, which have been previously described. The output control signals on buses 10-3, 11-3 are INTE, HLDA, SYNC, DBIN, WAIT and WR, and have also been described. The output control signals are compared in control comparator 6-3 which will generate a comparison error on bus 55 similar to that of the data comparator 6-1. Control comparator 6-1 includes conventional exclusive OR gates. The output of control comparator is enabled through NAND gate 48 by control signals from processor 29 via bus 56. The enabled signal is input to NAND gate 67 for latching into flip-flop 69 by phase 1 ($\phi$1) signal on bus 9-3.

A conventional bus driver 34 connects output control signals from subprocessor 26 to output bus 7-5 and comparator bus 10-3 via buses 40, 41.

The address signals generated by subprocessor 26 on 16-bit buses 45, 10-4 and by subprocessor 29 on bus 11-4 are compared in a similar manner in address comparator 6-4. Whenever a comparison error signal on bus 58 is detected it is enabled through NAND gates 49, 67 via control signals SYNC, WR, or DBIN on bus 59 and latched into flip-flop 69 by phase 1 ($\phi$1) signal. The Q output of the flip-flop 69 is a comparison error signal on bus 12-1 to the alarm monitor 54 of FIG. 1. The Q* output of flip-flop 69 is input on bus 12-3 to a light emitting diode (LED) to indicate the existence of a comparison error.

Figure 5:
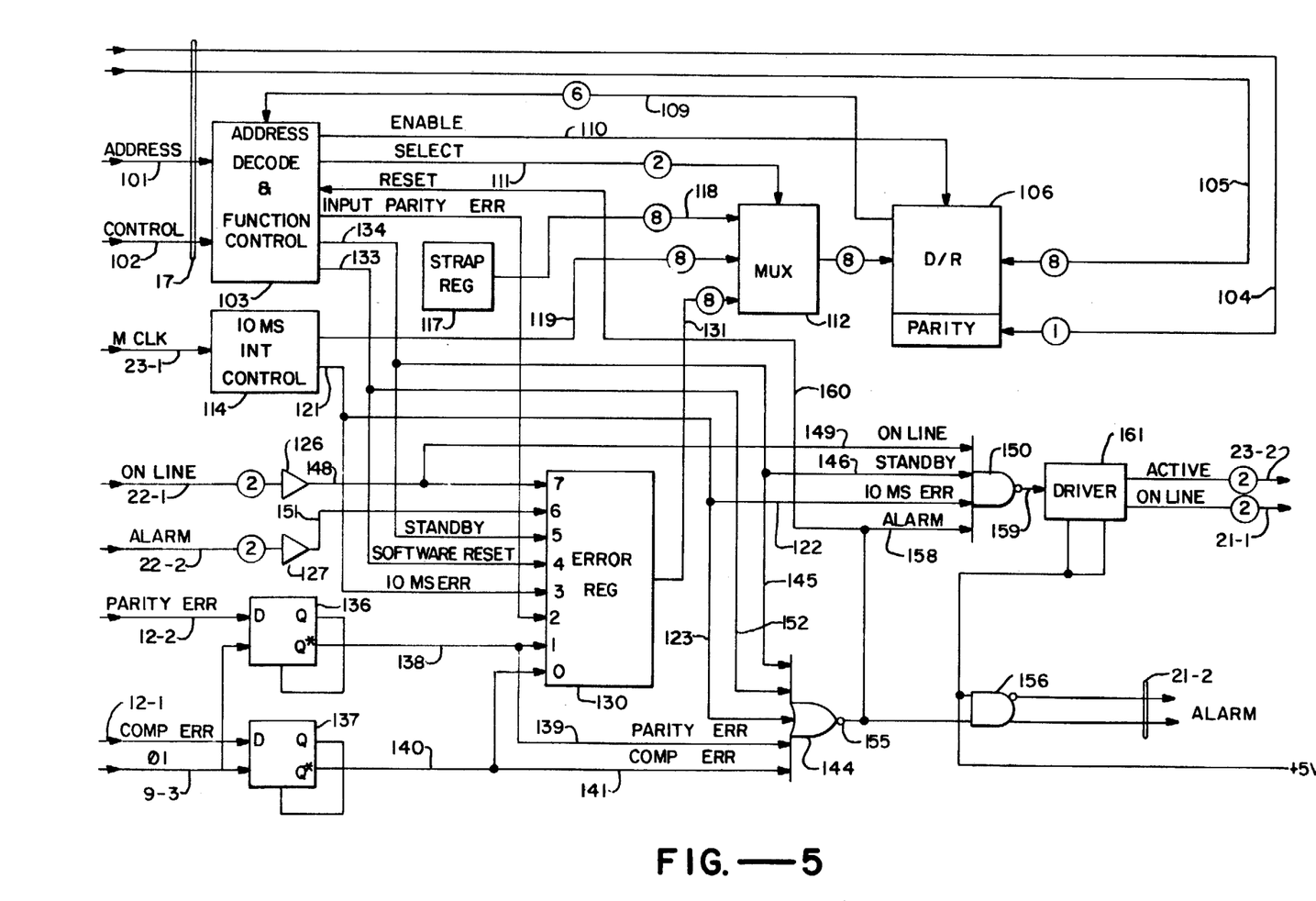
FIG. 5 depicts a block diagram of the alarm monitor, which forms a portion of FIG. 1.

Referring to FIG. 5, the alarm monitor 54 of FIG. 1 is shown in further detail. The bus parity error on bus 12-2 and comparison error signal on bus 12-1 are latched into flip-flops 136, 137 by the phase 1 ($\phi$1) signal and input in error register 130 via buses 138, 140. Error register 130 forms a portion of conventional four to one multiplexor 112.

Additionally, the parity and comparison error signals are gated through NOR gate 144 via buses 139, 141 with additional signals, which will be described subsequently, and output by conventional driver 156 as an alarm signal to the other system via bus 21-2. This alarm signal informs the other system through its alarm monitor 65 that an error is existing in the first master processor 50 of FIG. 1.

In FIG. 5, the 10 MS INT control circuit 114 provides a 10 ms interrupt signal to the master processor. Interrupt signals are common for many data processing systems. The 10 ms interrupt control circuit 114 includes a 2 MHz temperature compensated crystal oscillator divided down to provide the 10 ms interrupt signal. Additionally, logic circuitry provides appropriate checking of the 10 ms interrupt signal and should an error occur, a 10 ms error signal on bus 121 is generated which is latched into error register 130 and to NOR gate 144. Also, the 10 ms error signal is an input to the NAND gate 150.

Additionally, the 10 MS INT control circuit provides monitoring of the master clock 79 of FIG. 1. Conventional counters are utilized to count for 50 milliseconds out of every 100 milliseconds. The master clock 79 is running at 1.544 MHz and should have a tolerance of ±200 Hz. The control circuit will indicate whether the master clock is in fact running within the predetermined tolerance and input the data via the 8-bit bus 119 to conventional multiplexer 112 and sent to the processor 50.

The strap register 117 is provided for representing particular functions that are peculiar to the system, such as whether it is equipped with a magnetic taper recorder or a CRT display. The state of these straps are read by software programs, and are input to the multiplexer 112 via the 8-bit data bus 118.

The address decode and function control 103 serves an one function to identify the I/O address for alarm register 54. The strap register 117 forms one device number, the MC clock register in control circuit 114 forms another address, and the error register 130 forms a third address. The function control 103 enables the conventional driver/receiver 106 via bus 110 for receiving and transmitting data signals on the data bus 105, which forms a portion of bus 17 of FIG. 1. The address decode and function control 103 is shown in more detail in FIG. 6.

In FIG. 5, in order for a master processor to go on line, it must be free of alarms, must have the 10 ms interrupt, the other master processor must be off-line and it must be declared to be ready by the program through the setting of the stand-by signal into the NAND gate 150.

In FIG. 5, the conventional receivers 126, 127 receive on-line and alarm signals from the other alarm monitor 65 via buses 22-1, 22-2. The on-line signal on bus 22-1 is input as bit 7 to the error register 130 and also into NAND gate 150 via bus 149. The alarm signal on bus 22-2 is input as bit 6 of the error register 130 via bus 151.

The 8 bits into the error register 130 are set forth as follows in Chart I:

CHART I

| Bit | Error and Status |
|---|---|
| 7 | on-line |
| 6 | alarm |
| 5 | stand-by |
| 4 | software reset |
| 3 | 10 ms error |
| 2 | input parity error |
| 1 | bus parity error |
| 0 | CPU compare error |

The 8 bits in the error register 130 are input to multiplexer and output to the processor 50 of FIG. 1 at the appropriate time. This is controlled by address decode and function control 103, which is shown in more detail in FIG. 6.

The address decode 103 receives address and control signals on buses 101, 102 from the master processor 50 and provides the enable signal on bus 110 to the driver/receiver 106 and the select signal on bus 111 to the multiplexer 112. Also, the input parity error, stand-by, and software reset signals are input to the error register via buses 132, 133, 134. The stand-by and software reset signal is input to NOR gate 144 via buses 145, 152. The stand-by signal is also applied to the NAND gate 150 via bus 146. For any change in the state of NAND gate 150, conventional driver 161 will change the active signal on bus 23-2 to the master clock 79, thereby deactivating the operation of the subsystems for on-line conditions. Additionally, the driver 161 supplies an on-line signal on bus 21-1 to alarm monitor 65 of FIG. 1. This signal on bus 21-1 would correspond to bus 22-1 of FIG. 5.

Figure 6:
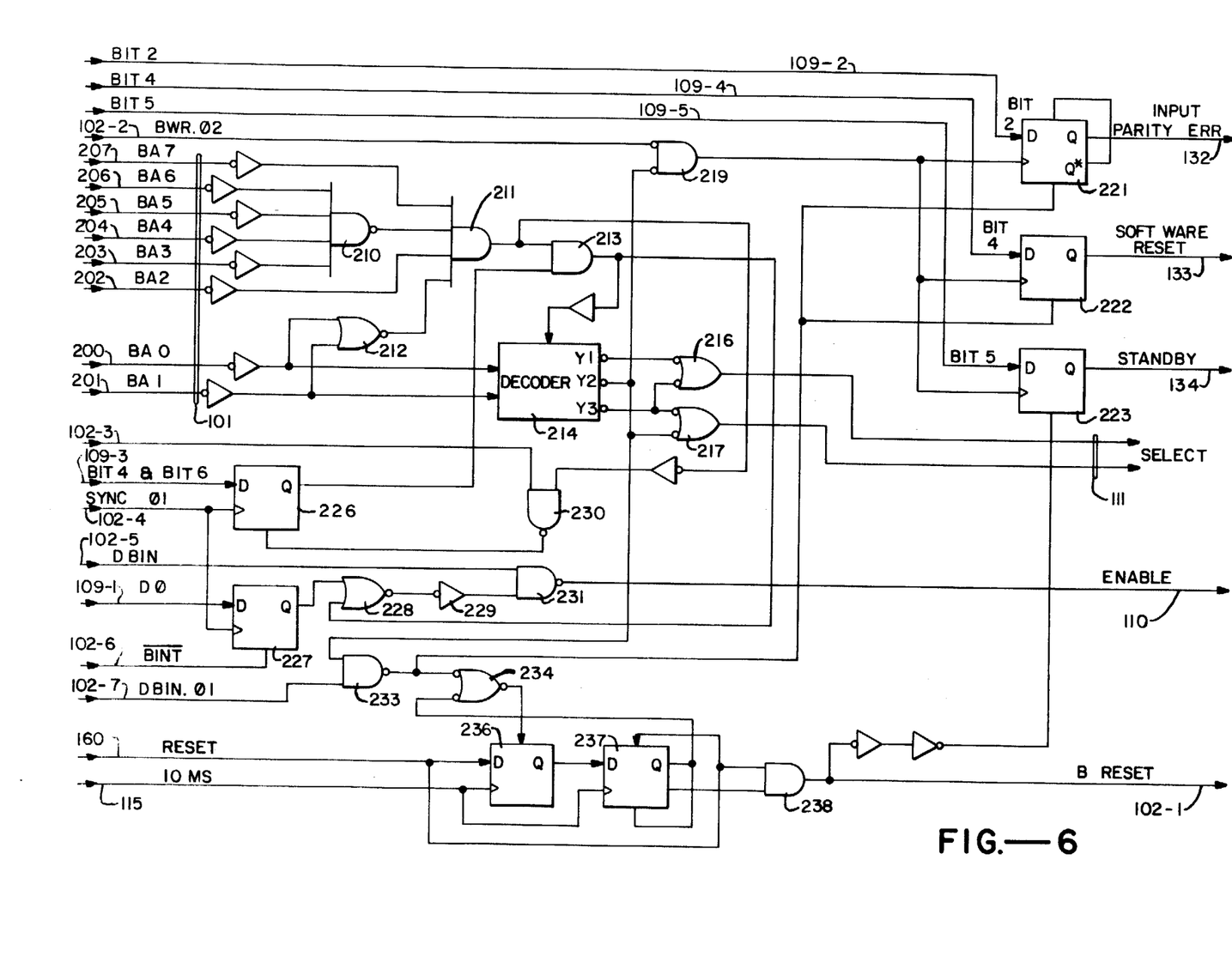
FIG. 6 depicts a schematic diagram of an address decode and function control circuit, which forms a portion of FIG. 5.

Referring to FIG. 6, the address decode circuit is shown in more detail with addresses A0-A7 input on bus 200-207 to conventional logic circuitry. Only eight bits are required because there are 256 input and output devices.

The alarm monitor 54 has 3 I/O addresses for communication with the processor 50, which in the present invention are addresses 171 to 173 (octal). The gating circuitry 210-217 will enable conventional decoder 214 for one of the three I/O addresses.

Specifically, address bits A0 and A1 on buses 200, 201 are input to NOR gate 212, which forms one input to NAND gate 211. Address bit A2 on bus 202 is another input to gate 211. Bits A3-A6 on buses 203-206 are input to NAND gate 210, which forms an input to gate 211. Bit A7 on bus 207 is another input to gate 211.

Status information from processor 50 is in 8 bits on bus 105 of FIG. 5. Instructions for the 8080 microprocessor require from one to five machine cycles for complete execution. The 8080 sends out 8 bits of status information on the data bus at the beginning of each maching cycle (during SYNC time). The following Chart II defines the status information for an INTEL 8080 microprocessor.

CHART II

| Symbols | Data Bus Bit | Definition |
|---|---|---|
| HLTA | D3 | Acknowledge signal for HALT instruction. |
| INTA | D0 | Acknowledge signal for INTERRUPT request. Signal should be used to gate a restart instruction onto the data bus when DBIN is active. |
| INP | D6 | Indicates that the address bus contains the address of an input device and the input data should be placed on the data bus when DBIN is active. |
| OUT | D4 | Indicates that the address bus contains the address of an output device and the data bus will contain the output data when WR is active. |
| MEMR | D7 | Designates that the data bus will be used for memory read data. |
| M1 | D5 | Provides a signal to indicate that the CPU is in the fetch cycle for the first byte of an instruction. |
| STACK | D2 | Indicates that the address bus holds the pushdown stack address from the Stack Pointer. |
| WO | D1 | Indicates that the operation in the current machine cycle will be a WRITE memory or OUTPUT function (WO = 0). Otherwise, a READ memory or INPUT operation will be executed. |

Status bits D0, D6, D7 can be used to control the flow of data onto the data bus.

In FIG. 6, the enable signal on bus 110 is generated as follows. Signal DBIN on bus 102-5 is NANDed in gate 231 with the D0 (INTA) signal which is NORed in gate 228 from flip-flop 227 during the appropriate I/O address from gate 213. The enable signal on bus 110 is used in FIG. 5 to enable the driver/receiver 106.

Gate 213 is enabled by the bit 4 or bit 6 signal latched via bus 109-3 into flip-flop 226. Bits 4 or 6 represent status information as set forth above in Chart II.

In FIG. 5, the driver/receiver 106 includes a parity checker (not shown) for checking the parity of the incoming data, on bus 104, and if a parity error exists, that signal is relayed to decode and function control 103 as bit 2, which is input in FIG. 6 to flip-flop 221 via bus 109-2, thereby forming an input parity error which is input to the error register 130 on bus 132. Bit 2 is latched into flip-flop 221 via signal BWR·φ2 on bus 102-2 NORed in gate 219 with the appropriate I/O address signal from decoder 214 (here I/O address 171 octal).

A software reset error, which is bit 4, is latched via bus 109-4 into flip-flop 222 in a similar fashion thereby forming the software reset signal on bus 133. The software reset is a reset signal from processor 50.

The bit 5 signal on bus 109-5 is a software stand-by signal and is latched into flip-flop 223 in a similar fashion. The state of the stand-by signal on bus 134 is one of the conditions required for a master processor such as processor 50 to go on-line, if it is off-line at that time.

In FIG. 5, when the alarm monitor 54 detects any of the error signals from the NOR gate 144, a reset signal on bus 160 is latched into flip-flop 236 of FIG. 6 by a 10 ms clock signal on bus 115. This reset signal when latched into flip-flop 237 and ANDed in gate 238 with the alarm signal on bus 160 will be in the B RESET signal on bus 102-1 which is sent to the master processor 50 of FIG. 1. The reset signal function has been previously described.

In FIG. 6, the bit 4 or bit 6 signal on bus 109-3 into flip-flop 226 and is used by the decode circuitry for identifying whether the address bus contains the address of an input device or an output device. This information is from bits 4 or 6 on the data bus is part of the status information.

The SELECT signal on bus 111 is 2 bits from NAND gates 216, 217, and will select the appropriate data from the conventional multiplexer 112 of FIG. 5.

In FIG. 5, if the alarm monitor 54 receives a bus parity error on bus 12-2 or CPU comparison error on bus 12-1 from the master processor 50, it will be latched into flip-flops 136, 137 as previously described. Once latched, either one can initiate a system reset through the NOR gate 144 and to the function control 103 as described above. The program can also initiate a system reset by setting the software reset flip-flop 222 in FIG. 6.

When the master processor reloads after the reset signal, one of the first things it does is to read the error register 130 (I/O address 171) to see what is causing the reset and also to clear all the alarm flip-flops.

For writing into alarm register 54 by processor 50, register 54 is addressed for an output cycle and the address is checked by the decode circuitry of FIG. 6. With bit 4 (OUT) of the processor status set, the high will be clocked into the flip-flop 226. Decoder 214 is enabled, and the outputs go low to enable the NAND gates 216, 217. With no DBIN signal sent by the processor, no data will be sent out on the data bus. Instead, signal WR ANDed with phase 2 (φ2) on bus 102-2 is sent by the processor to enable gate 219. The output of gate 219 will go low to clock bits 4 and 5 into the flip-flops 222, 223 and the parity check output into the flip-flop 221. The processor 50 sets the flip-flop 221 to start a software initiated system reset, and sets flip-flop 223 to mark that the processor is now ready to go on-line.

In FIGS. 5 and 6, the processor 50 will go on-line if the stand-by flip-flop 223 indicates it is in fact on stand-by, there is no alarm as indicated by NOR gate 144, the processor is answering the 10 ms interrupt signal, and the other system controller is not on line as indicated by a low output via receiver 126.

Under such circumstances, the output of NAND gate 150 will go low to turn on conventional driver 161 to inform the other system controller 64 and the master clock 79 in the subsystem that master processor 50 is now on-line. Once master processor 50 is on-line, it will block the other master processor 64 from coming on-line by blocking NAND gate 150 in the alarm monitor 65 (via receiver 126' and bus 149').

The alarm output from the NOR gate 144 is also sent to the other master processor 64 through conventional differential driver 156 and bus 21-2. The on-line alarm input via bus 22-1 from the other master processor 64 read by the master processor 50 in reading I/O port 171, the alarm register.

What is claimed is:

1. In a data processing system, a double redundant processor comprising:
    first and second master processors for processing data, control and address signals of said system where said first master processor is in an active state for processing said signals and said second master processor is in a stand-by state for processing said signals, said first and second master processors each including:
    first and second subprocessors having a common memory for simultaneously processing said signals, said first subprocessor having means for transmitting to and receiving from said system said data, control and address signals of said system and said second subprocessor having means for receiving said data, control and address signals of said system,
    comparator means connected to continuously compare all of the processed signals from said first and second subprocessors for generating a comparison error signal when a comparison error occurs in the active master processor, and
    alarm monitor means responsive to said error signal for inactivating the active master processor and activating the stand-by master processor when said error signal occurs.

2. A processor as in claim 1 further including a bidirectional common data bus for carrying said data signals into and out from said master processor, a first bidirectional driver/receiver for connecting said data signals between said common bus and said first subprocessor, and for connecting said data signals between said first subprocessor and said comparator means.

3. A processor as in claim 2 further including a second bidirectional driver/receiver for connecting said data signals between said common bus and said second subprocessor, a first unidirectional data bus for connecting said second driver/receiver to said second subprocessor, and a third unidirectional data bus connected between said second data bus and said comparator means for connecting said data signals from said second subprocessor to said comparator means.

4. A processor as in claim 1 wherein said comparator means include data comparator means for comparing said data signals, control comparator means for comparing said control signals, and address comparator means for comparing said address signals.

5. A processor as in claim 1 further including a first common control bus for connecting input control signals to said first and second subprocessors, a second common output control bus, a first output control bus for connecting output control signals from said first subprocessor to said second common bus and to said comparator means, a second output bus for connecting said second subprocessor to said comparator means.

6. A processor as in claim 1 further including a first output address bus connected to said first subprocessor for outputting address signals, a second address bus connected between said first address bus and said comparator means, and a third address bus connected between said second subprocessor and said comparator means.

7. A processor as in claim 4 further including logic means responsive to said comparator output means for connecting said error signal to said alarm monitor means.

8. A processor as in claim 7 wherein said logic means include enabling means connected to said comparator means, said enabling means responsive to predetermined control signals from said second subprocessor thereby enabling said error signal.

9. A processor as in claim 2 where said data signals include a first parity signal and wherein said first driver/receiver includes parity generator means for generating a second parity signal corresponding to the parity of said data signal, logic means connected to receive said first and second said parity signals, thereby generating a parity error signal when said signals differ.

10. A processor as in claim 1 wherein said alarm monitor means include
  a first alarm monitor connected to receive an error signal from said first master processor whereby said first monitor generates an alarm signal,
  a second alarm monitor connected to said second master processor and to said first alarm monitor for receiving said alarm signal whereby said second master processor is activated and said first master processor is inactivated.

11. A processor as in claim 1 wherein said alarm monitor means include logic means connected to receive said error signal for providing said alarm signal to said other master processor.

12. A processor as in claim 11 wherein said logic means include driver means responsive to said alarm signal connected to inactivate said first master processor.

13. A double redundant processor for controlling the operation of an integrated message accounting system, said processor comprising:
  master clock means responsive to an active signal for activating said system,
  first and second master processors for processing data, control and address signals of said accounting system where said first master processor is in an active state for processing said signals and said second master processor is in a stand-by state for processing said signals, said first and second master processors each including:
    first and second subprocessors having a common memory for simultaneously processing said signals, said first subprocessor having means for transmitting to and receiving from said system said data, control and address signals of said system and said second subprocessor having means for receiving said data, control and address signals of said system,
  comparator means connected to continuously compare all of the processed signals from said first and second subprocessors for generating a comparison error signal when a comparison error occurs in the active master processor,
  means for generating said active signal, and
  alarm monitor means responsive to said error signal for inactivating the active master processor and activating the stand-by master processor when said error signal occurs.

14. In an integrated message accounting system, a double redundant processor for controlling the operation of the system comprising:
  first and second master processors for processing data, control and address signals of said accounting system where said first master processor is in an on-line state for actively processing said signals and said second master processor is in an off-line stand-by state for processing said signals, said first and second master processors each including:
    first and second subprocessors having a common memory for simultaneously processing said signals, said first subprocessor having means for transmitting and receiving said data, control and address signals of said system and said second subprocessor having means for receiving said data, control and address signals of said system and
  comparator means connected to continuously compare said processed signals from said first and second subprocessors for generating a comparison error signal when a comparison error occurs in the active master processor,
  first and second master clocks responsive to an active signal for activating said system,
  a first alarm monitor including means for generating a first active signal thereby activating said first master clock and means for generating a first on-line signal when said first master processor is active and on-line, said first alarm monitor including means responsive to a first error signal from said first master processor for generating a first alarm signal and means responsive to said first alarm signal for changing said first on-line signal to a first off-line signal,
  a second alarm monitor including means for generating a second active signal thereby activating said second master clock and means for generating a second on-line signal, said second alarm monitor including means responsive to a second error signal from said second master processor for generating a second alarm signal, said second alarm monitor connected to receive said first on-line signal and responsive thereto for preventing said second master processor from actively processing said signals, said second alarm monitor including means responsive to said first on-line signal for generating said second active signal when said first on-line signal changes to said off-line signal, thereby activating said second master clock and said second master processor,
  said first alarm monitor connected to receive said second on-line signal and responsive thereto for preventing said first master processor from actively processing said signals.

15. In a digital telephone system having a double redundant processor including first and second master processors for processing information signals where said first master processor is in an active state for processing said signals and the second master processor is in a stand-by state for processing said signals, said first and second master processors each including first and second subprocessors having a common memory for simultaneously processing said signals, said first subprocessors having means for transmitting to and receiving from said system said information signals of said system and said second subprocessors having means for receiving said information signals of said system, the method of checking the operation of said master processors comprising the steps of:

continuously comparing all of the processed signals of said first and second subprocessors, generating a comparison error signal when a comparison error occurs in the active master processor, and inactivating the first master processor and activating the second master processor in response to an occurrence of said error signal from the first master processor.

16. In a digital telephone system, a double redundant processor comprising:

first and second master processors for simultaneously processing information signals of said system where said first master processor is in an active state for processing said signals and said second master processor is in a stand-by state for processing said signals, said first and second master processors each including:

first and second subprocessors having a common memory for simultaneously processing said signals, said first subprocessors having means for transmitting to and receiving from said system said data, control and address signals of said system and said second subprocessor having means for receiving said data, control and address signals of said system, comparator means connected to continuously compare all of the processed signals from said first and second subprocessors for generating a comparison error signal when a comparison error occurs in the first active master processor, and alarm monitor means responsive to said error signal for inactivating the first master processor and activating the second master processor when said error signal occurs.

* * * * *